(12) United States Patent
Wolfe

(10) Patent No.: US 6,311,429 B1
(45) Date of Patent: Nov. 6, 2001

(54) TREE IMPLANT DEVICE

(76) Inventor: Bryan K. Wolfe, 222 Park Ave., Fremont, NE (US) 68025

( * ) Notice: Subject to any disclaimer, the term of this patent is extended or adjusted under 35 U.S.C. 154(b) by 0 days.

(21) Appl. No.: 09/625,405

(22) Filed: Jul. 25, 2000

(51) Int. Cl.[7] .................................................. A01G 7/06
(52) U.S. Cl. .................................... 47/57.5; 47/11; 47/50
(58) Field of Search ............................. 47/57.5, 50–54, 47/11, 73

(56) References Cited

U.S. PATENT DOCUMENTS

| 1,999,458 | 4/1935 | Hollister | 47/57.5 |
| 3,706,161 | 12/1972 | Jenson | 47/57.5 |
| 4,342,176 | * 8/1982 | Wolfe | 47/57.5 |

FOREIGN PATENT DOCUMENTS

0469235 A2 * 5/1992 (SE) .................................. A01G/7/06

* cited by examiner

Primary Examiner—Peter M. Poon
Assistant Examiner—Floris C. Copier
(74) Attorney, Agent, or Firm—Nixon & Vanderhye, P.C.; Frank P. Presta

(57) ABSTRACT

An implant device for insertion into the opening of a tree to provide medication to the tree, comprising an elongated, hollow housing of a length adapted to fit within the tree opening, the housing having an enlarged, closed outer end portion of a size approximately the same as that of the tree opening, and a closed inner end portion. A pair of elongated wing portions are disposed on opposite sides of the housing and extend longitudinally from a point near the inner end portion to the outer end portion, the wing portions extending radially outwardly approximately the same distance as the outer end portions. A pair of outwardly and longitudinally extending flexible projections are disposed on opposite sides of the housing between the wing portions and define generally U-shaped openings in the housing on opposite sides thereof in communication with the interior thereof. A locking barb is disposed on each of the projections and extends radially outwardly approximately the same distance as the wing portions. Tree medication is disposed within the interior of the housing near the projections and U-shaped openings.

9 Claims, 2 Drawing Sheets

TREE IMPLANT DEVICE

BACKGROUND OF THE INVENTION

The present invention relates to a device for feeding medication into trees or the like and, more particularly, to such a device that is implanted in an opening or hole in the trunk or stem of a tree.

Trees are treated for various diseases or deficiencies by the introduction of medication into the tree itself. One method of introducing the medication into a tree is to drive a capsule containing the desired medication into the trunk of the tree, enabling the phloem layer of the tree to absorb the medication from the capsule. A problem in designing a medication containing capsule for such a use is that the medication must be retained in the capsule until it is inserted into the tree and yet once the capsule has been inserted, the medication must be freed from the capsule to be absorbed by the tree.

U.S. Pat. No. 1,999,458 attempts to solve this problem by providing a hollow capsule with openings which are covered by film-like coverings that are disrupted or worn away by friction between the wall of the capsule and the hole in the tree. This method of solving the problem requires that there be an appropriate interference fit between the hole in the tree and the capsule and that the film-like coverings have not flowed into the openings but have remained on top of the openings to insure that the openings are opened by the friction.

Another problem associated with the use of a medication capsule inserted into the trunk of a tree, is the defense mechanism of the tree which builds up sap pressure at the intrusion of a foreign object, such as a medication capsule, in an attempt to eject the foreign object from the tree.

Yet another problem associated with the use of medication capsules inserted into trees is the post-treating of the tree after the capsule is in place. Once the capsule is inserted into the trunk of the tree, the resulting hole must be closed and a tree wound dressing must be applied to help the tree heal and prevent insects from attacking the tree at the wound.

The above-identified problems have been alleviated by the tree medication capsule in U.S. Pat. No. 3,706,161 which comprises elongated slots sealed with a sap soluble material to retain the medication within the capsule until it is inserted into the tree. The capsule is provided with anti-rejection barbs which engage the tree upon insertion of the capsule therein to prevent it from being ejected by the sap pressure. To close the hole in the tree, the capsule has an enlarged outer end portion with a ring of tree wound dressing thereon so that the hole in the tree is closed when the capsule is driven into it. While the tree medication capsule of U.S. Pat. No. 3,706,161 has generally served its intended purpose, its construction has not ensured that an effective amount of medication is released into the tree in all cases. Also, its generally flat inner end has sometimes made it difficult to insert the capsule into a tree opening.

The tree implant device of the present invention is not subject to any of the disadvantages of the prior art devices and possesses many advantages over the prior art devices.

SUMMARY OF THE INVENTION

The tree implant device of the present invention generally comprises a substantially cylindrical, hollow housing having an enlarged outer end portion and a tapered inner end portion. The housing has a pair of elongated wing portions on opposite sides thereof that extend longitudinally from a point near the inner end portion thereof to the enlarged outer end portion. The wing portions extend radially outwardly about the same distance as the enlarged outer end portion extends radially outwardly from the housing. Between the wing portions on opposite sides of the housing there are disposed rearwardly extending, elongated, flexible projections with generally U-shaped openings around them that are open to the interior of the housing. A radially outwardly extending locking barb or tab is disposed on the outer end portion of each projection and is of a radial width generally the same as that of the wing portions and enlarged outer end portion.

A tree medication of any suitable type is disposed in the inner hollow portion of the housing between the projections on opposite sides thereof and adjacent to the U-shaped openings surrounding the projections.

Upon insertion of the implant device into the opening or hole in a tree, the tapered inner end portion facilitates such insertion and the elongated wing portions slidably engage the adjacent inner surface of the tree to further facilitate the insertion of the implant device therein. The locking barbs or tabs on the ends of the projections also engage the adjacent inner surface of the tree and are shaped to prevent the implant device from being ejected from the tree opening once it is positioned therein. The enlarged outer end portion is provided on its inner annular surface with an appropriate tree wound dressing and serves to close the hole in the tree when the implant device is fully positioned within the tree opening.

Upon the build-up of sap pressure within the tree opening, the elongated projections on opposite sides of the housing are deformed inwardly to squeeze or crush and subsequently release the medication contained within the housing through the U-shaped openings into the tree. The medication may be in any suitable form, such as encapsulated powders, vials of liquid or the like. The U-shaped openings surrounding the projections are of sufficient size to ensure the adequate release of medication from the implant device into the active vascular system of the tree.

DESCRIPTION OF THE PREFERRED EMBODIMENTS

Figure 3:
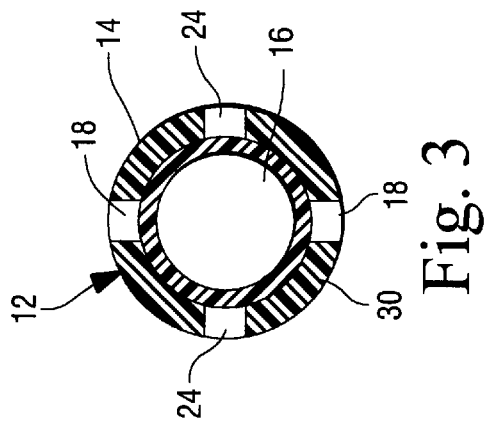
FIG. 3 is a front elevational view of the tree implant device.
Figure 2:
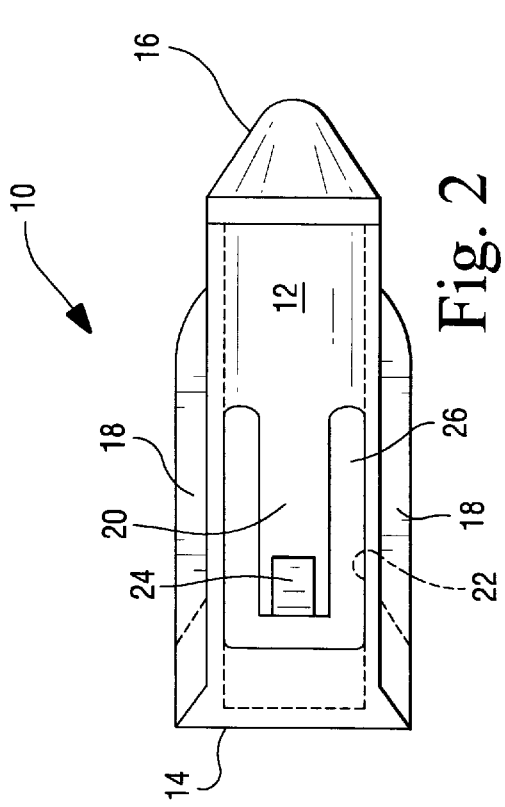
FIG. 2 is a side elevational view of the tree implant device shown in FIG. 1.
Figure 1:
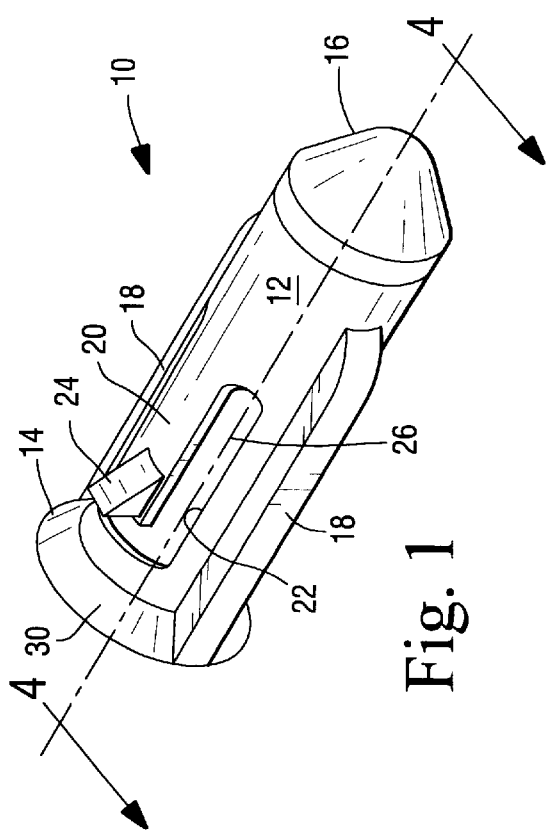
FIG. 1 is a perspective view of the tree implant device of the present invention.

As shown in FIGS. 1 and 2, the tree implant device 10 of the present invention generally comprises a substantially cylindrical, hollow housing 12 having an enlarged outer end portion 14 and a tapered inner end portion 16. The housing 12 has a pair of elongated wing portions 18 on opposite sides thereof that extend longitudinally from a point near the inner end portion 16 to the enlarged outer end portion 14. The wing portions 18 preferably extend radially outwardly about the same distance as the enlarged outer end portion 14 extends radially outwardly from the housing 12, as shown in FIGS. 1–3.

Between the wing portions 18 on opposite sides of the housing 12 there are disposed rearwardly extending, elongated, flexible projections 20 that are defined by generally U-shaped openings 22 that are open to the interior of the housing 12. A radially outwardly extending locking barb or tab 24 is disposed on the outer end of each projection 20 and preferably is of a radial width generally the same as that of the wing portions 18 and enlarged outer end portion 14. As shown in FIG. 1, the locking barbs 24 have an inwardly tapered outer surface to facilitate the insertion of the tree implant device 10 in a tree opening. The sharp outer edge of each locking barb 24 prevents the ejection of the tree implant device from the tree opening once it is inserted therein.

The housing 12 may be formed of any suitable material, such as plastic, and may be of unitary construction or the parts thereof may be assembled together in any suitable manner.

A tree medication 26 of any suitable type is disposed in the inner hollow portion of the housing 12 between the projections 20 on opposite sides thereof and adjacent to the U-shaped openings 22 surrounding the projections 20. The tree medication 26, for example, may be a vial of liquid medication or an encapsulated powder.

Figure 4:
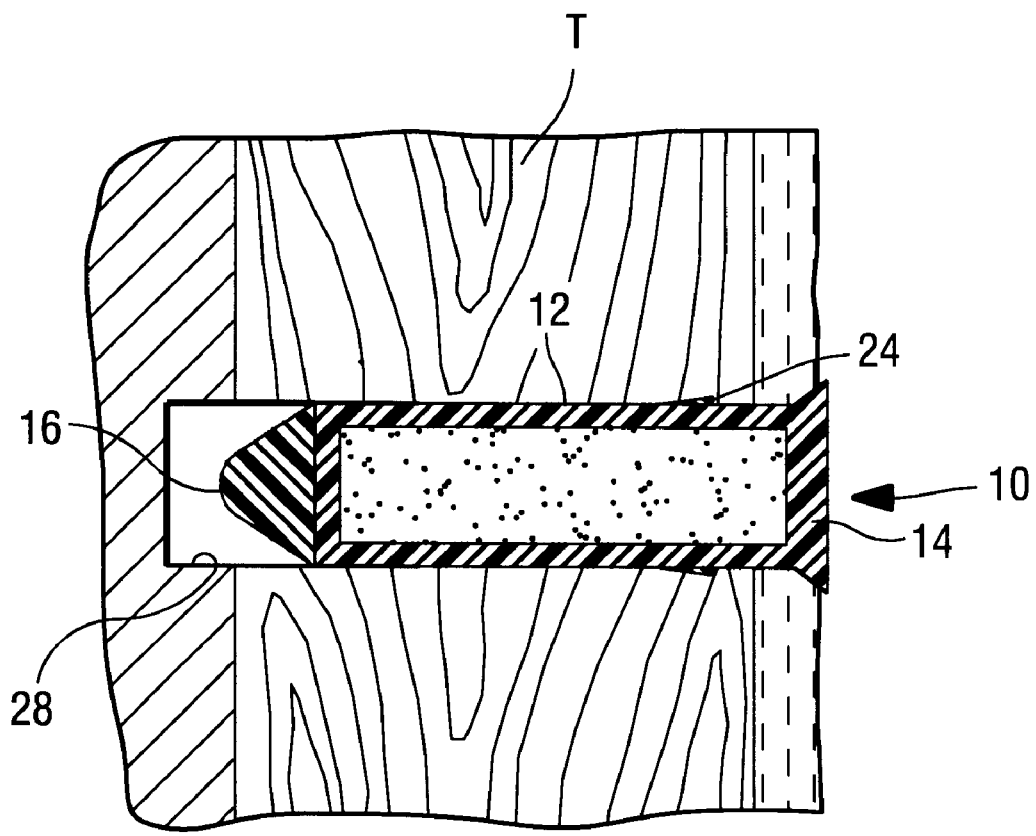
FIG. 4 is a cut-away view of a portion of a tree trunk showing the tree implant device in section inserted therein.

In the operation of the present invention, upon insertion of the implant device 10 into the opening or hole 28 in a tree T, the tapered inner portion 16 facilitates such insertion and the elongated wing portions 18 slidably engage the adjacent inner surface of the tree T to further facilitate the insertion of the implant device therein. As shown in FIG. 4, the locking barbs 24 on the ends of the projections 20 also engage the adjacent inner surface of the tree T and the sharp outer edges thereof prevent the implant device 10 from being ejected from the tree opening 28 once it is positioned therein. The enlarged outer end portion 14 is provided on its inner annular surface 30 with an appropriate tree wound dressing and serves to close the opening 28 in the tree T when the implant device 10 is fully positioned within the tree opening, as shown in FIG. 4.

Upon the build-up of sap pressure within the tree opening 28, the elongated projections 20 on opposite sides of the housing 12 are deformed inwardly to squeeze or crush, and subsequently release the medication 26 contained within the housing through the U-shaped openings 22 into the tree T. The U-shaped openings 22 are of sufficient size to insure the adequate release of medication from the implant device 10 into the active vascular system of the tree T.

From the foregoing description, it will be seen that the tree implant device 10 of the present invention is simple in construction, easy to install in the hole or opening in a tree, and is constructed to insure that adequate medication is released from the implant device into the tree when the implant device is inserted in the opening the tree.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An implant device for insertion into the opening of a tree to provide medication to the tree, comprising:
    an elongated, hollow housing of a length adapted to fit within the tree opening, said housing having an enlarged, closed outer end portion of a size approximately the same as that of the tree opening, and a closed inner end portion;
    a pair of outwardly and longitudinally extending flexible projections on said housing disposed on opposite sides thereof, said projections defining generally U-shaped openings in said housing on opposite sides thereof in communication with the interior thereof;
    a locking barb on each of said projections and extending radially outwardly approximately the same distance as said outer end portion of said housing; and
    tree medication disposed within the interior of said housing; whereby upon insertion of the implant device into the tree opening, said locking barbs engage the adjacent tree surface defining the opening, said outer end portion of said housing closes the tree opening, and said projections thereafter are deformed inwardly by the build-up of tree sap pressure to effect the release of medication through said U-shaped openings into the tree.

2. The implant device of claim 1 further comprising a pair of elongated wing portions on opposite sides of said housing between said projections, said wing portions extending longitudinally from a point near said inner end portion to said outer end portion, said wing portions extending radially outwardly approximately the same distance as said outer end portion whereby they are adapted to slidably engage the adjacent tree surface defining the opening therein.

3. The implant device of claim 1 wherein said closed inner end portion is tapered inwardly to facilitate insertion of the implant device into the tree opening.

4. The implant device of claim 1 wherein said enlarged closed outer end portion has an inner annular surface with tree wound dressing thereon.

5. The implant device of claim 1 wherein said wing portions taper inwardly toward said housing at the inner ends thereof.

6. The implant device of claim 1 wherein said locking barbs are tapered inwardly to slidably engage the adjacent tree surface upon insertion of the implant device into the tree opening, said locking barbs having a sharp outer edge which engages the adjacent tree surface to resist outward movement of the implant device from the tree opening after it has been inserted therein.

7. The implant device of claim 1 wherein said housing, said wing portions and said projections are formed of unitary construction and a plastic material.

8. The implant device of claim 1 wherein said medication is an encapsulated powder.

9. The implant device of claim 1 wherein said medication is a vial of liquid.

* * * * *